United States Patent
Kahn et al.

(10) Patent No.: US 7,072,910 B2
(45) Date of Patent: Jul. 4, 2006

(54) FILE FOLDING TECHNIQUE

(75) Inventors: Andy C. Kahn, San Francisco, CA (US); Kayuri Patel, Cupertino, CA (US); Raymond C. Chen, Campbell, CA (US); John K. Edwards, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 406 days.

(21) Appl. No.: 10/104,694

(22) Filed: Mar. 22, 2002

(65) Prior Publication Data

US 2003/0182317 A1 Sep. 25, 2003

(51) Int. Cl.
*G06F 17/30* (2006.01)

(52) U.S. Cl. ............... 707/201; 707/204; 707/202; 707/200; 707/100; 707/1

(58) Field of Classification Search ............. 707/100, 707/1, 202, 201, 204, 200, 203, 205
See application file for complete search history.

(56) References Cited

U.S. PATENT DOCUMENTS

| | | | |
|---|---|---|---|
| 4,570,217 A | | 2/1986 | Allen et al. |
| 5,163,131 A | | 11/1992 | Row et al. |
| 5,202,979 A | | 4/1993 | Hillis et al. |
| 5,278,979 A | | 1/1994 | Foster et al. |
| 5,355,453 A | | 10/1994 | Row et al. |
| 5,485,579 A | | 1/1996 | Hitz et al. |
| 5,634,050 A | * | 5/1997 | Krueger et al. ............. 707/200 |
| 5,802,366 A | | 9/1998 | Row et al. |
| 5,819,292 A | | 10/1998 | Hitz et al. |
| 5,931,918 A | | 8/1999 | Row et al. |
| 5,941,972 A | | 8/1999 | Hoese et al. |
| 5,963,962 A | * | 10/1999 | Hitz et al. ................. 707/202 |
| 5,978,791 A | * | 11/1999 | Farber et al. ............... 707/2 |
| 6,065,037 A | | 5/2000 | Hitz et al. |
| 6,256,642 B1 | * | 7/2001 | Krueger et al. ............. 707/205 |
| 6,289,356 B1 | * | 9/2001 | Hitz et al. ................. 707/201 |
| 6,415,280 B1 | * | 7/2002 | Farber et al. ............... 707/2 |
| 6,425,035 B1 | | 7/2002 | Hoese et al. |
| 6,633,891 B1 | * | 10/2003 | Bamford et al. ............ 707/203 |
| 6,636,879 B1 | * | 10/2003 | Doucette et al. ............ 707/205 |
| 6,721,764 B1 | * | 4/2004 | Hitz et al. ................. 707/202 |
| 6,728,922 B1 | | 4/2004 | Sundaram et al. |
| 6,748,504 B1 | * | 6/2004 | Sawdon et al. ............. 711/162 |
| 6,829,617 B1 | * | 12/2004 | Sawdon et al. ............. 707/102 |
| 6,983,296 B1 | * | 1/2006 | Muhlestein et al. ........ 707/206 |
| 2002/0083037 A1 | | 6/2002 | Lewis et al. |
| 2002/0112022 A1 | | 8/2002 | Kazer et al. |
| 2002/0116593 A1 | | 8/2002 | Kazer et al. |
| 2003/0158834 A1 | * | 8/2003 | Sawdon et al. ............. 707/1 |
| 2003/0158873 A1 | * | 8/2003 | Sawdon et al. ............. 707/204 |

OTHER PUBLICATIONS

Common Internet File System (CIFS) Version: CIFS–Spec 0.9, Storage Networking Industry Association (SNIA), Draft SNIA CIFS Documentation Work Group Work–in–Progress, Revision Date: Mar. 26, 2001.

(Continued)

Primary Examiner—Jean M. Corrielus
(74) Attorney, Agent, or Firm—Cesari and McKenna, LLP

(57) ABSTRACT

A file folding technique reduces the number of duplicate data blocks of a file consumed on a storage device of a file server configured to generate a persistent image of its active file system at a point in time. According to the file folding technique, if "old" data blocks of the file are over-written with "new" data and that new data is identical to the data of the persistent file image, the old data blocks are "freed" and the file is directed to refer to the persistent image for its data. The invention reduces disk space consumption in a file server configured to generate persistent images of its active file system and, in particular, reduces overall persistent image disk usage.

32 Claims, 7 Drawing Sheets

OTHER PUBLICATIONS

Akyurek, Sedat, *Placing Replicated Data to Reduce Seek Delays,* Department of Computer Science, University of Maryland, UMIACS–TR–91–121, CS–TR–2746, Aug. 1991.

Bitton, Dina, *Disk Shadowing,* Proceedings of the 14$^{th}$ VLDB Conference, LA, CA 1988.

Chaudhuri, Surajit, et al., *Self–Tuning Technology in Microsoft SQL Server,* Data Engineering Journal 22, Feb. 1999 pp. 20–27.

Chutani, Sailesh, et al., *The Episode File System,* In Proceedings of the USENIX Winter 1992.

Coyne, Robert A., et al., *Storage Systems for National Information Assets,* Proc. Supercomputing 92, Minneapolis, Nov. 1992, pp. 626–633.

Finlayson, Ross S., et al., *Log Files: An Extended File Service Exploring Write–Once Storage* Department of Computer Science, Stanford University, Report No. STAN–CS–87–1177, Sep. 1987.

Gray, Jim, et al., *The Recovery Manager of the System R Database Manager,* ACM Computing Surveys, (13)2:223–242 1981.

Hecht, Matthew S., et al. *Shadowed Management of Free Disk Pages with a Linked List,* ACM Transactions on Database Systems, 8/4, Dec. 1983, pp. 503–514.

Howard, John, H. et al., *Scale and Performance in a Distributed File System,* Carnegie Mellon University, CMU–ITC–87–068, Aug. 1987.

Howard, John H., *An Overview of the Andrew File System,* Carnegie Mellon University, CMU–ITC–88–062 1988.

Howard, John, H. et al., *Scale and Performance in a Distributed File System,* ACM Trans. Computer System, 6(1), Feb. 1988 pp. 51–81.

Kazar, Michael Leon, *Synchronization and Caching Issues in the Andrew File System,* Carnegie Mellon University, CMU–ITC–88–063.

Kazar, Michael. L., et al., *DEcorum File System Architectural Overview,* USENIX Summer Conference, Anaheim, California, 1990.

Kemper, Alfons, et al., *Performance Tuning for SAP R/3,* Data Engineering Journal 22, Feb. 1999 pp. 33–40.

Kent, Jack et al., *Optimizing Shadow Recovery Algorithms,* IEEE Transactions on Software Engineering, 14(2): 155–168, Feb. 1988.

Kistler, et al., *Disconnected Operation in the Coda File System,* ACM Transactions on Computer Systems, vol. 10, No. 1, Feb. 1992, pp. 3–25.

Lorie, Raymond, A. *Physical Integrity in a Large Segmented Database,* ACM Trans. Database Syst., vol. 2, Mar. 1977, pp. 91–104.

Ousterhout, John et al., *Beating the I/O Bottleneck: A Case for Log–Structured File Systems,* Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID),* Technical Report, CSD–87–391, Computer Science Division, Electrical Engineering and Computer Sciences, University of California at Berkeley 1987.

Patterson, D., et al., *A Case for Redundant Arrays of Inexpensive Disks (RAID),* SIGMOD International Conference on Management of Data, Chicago, IL, USA, Jun. 1–3, 1988, Sigmod Record (17)3:109–16 Sep. 1988.

Peterson, Zachary Nathaniel Joseph, *Data Placement for Copy–on–Write Using Virtual Contiguity,* University of CA, Santa Cruz, Master's Thesis for the Department of Science in Computer Science, Sep. 2002.

Quinlan, Sean, *A Cached WORM File System,* Software–Practice and Experience, 21(12):1289–1299 1991.

Rosenblum, Mendel, et al., *The LFS Storage Manager,* Computer Science Divison, Electrical Engineering And Computer Sciences, Univ. of CA, presented at Summer '90 USENIX Technical Conference, Anaheim, CA Jun. 1990.

Rosenblum, Mendel, et al. *The Design and Implementation of a Log–Structured File System* Jul. 24, 1991 pp. 1–15.

Rosenblum, Mendel, *The Design and Implementation of a Log–Structured File System,* 1992 pp. 1–93.

Rosenblum, Mendel, et al., *The Design and Implementation of a Log–Structured File System,* In Proceedings of ACM Transactions on Computer Systems, (10)1:26–52, Feb. 1992.

Schiefer, Berni, et al., *DB2 Universal Database Performance Tuning,* Data Engineering Journal 22, Feb. 1999 pp. 12–19.

Seltzer, Margo I., et al., *Journaling Versus Soft Updates: Asynchronous Meta–Data Protection in File Systems,* Proceedings of 200 USENIX Annual Technical Conference, Jun. 18–23, 2000.

Shasha, Dennis, *Tuning Time Series Queries in Finance: Case Studies and Recommendations,* Data Engineering Journal 22, Feb. 1999 pp. 41–47.

Sidebotham, Bob, *Volumes: The Andrew File System Data Structuring Primitive,* EEUG Conference Proceedings, Manchester, UK, Autumn 1986.

Subramanian, Muralidhar, et al., *Performance Challenges in Object–Relational DBMSs,* Data Engineering Journal 22, Feb. 1999 pp. 28–32.

Weikum, Gerhard, et al., *Towards Self–Tuning Memory Management for Data Servers,* Data Engineering Journal 22, Feb. 1999 pp. 3–11.

West, Michael, et al., *The ITC Distributed File System: Prototype and Experience,* Carnegie–Mellon University, Technical Report CMU–ITC–040, Mar. 1985.

Zayas, Edward R., AFS–3 Programmer's Reference: Architectural Overview, Transarc Corporation, Pittsburgh, PA, 1.0 edition 1991.

\* cited by examiner

FILE FOLDING TECHNIQUE

FIELD OF THE INVENTION

The present invention relates to file systems and, more specifically, to a technique for efficiently reducing disk space consumption of a file server configured to generate persistent images of its active file system.

BACKGROUND OF THE INVENTION

A file server is a computer that provides file service relating to the organization of information on writeable persistent storage devices, such as memories, tapes or disks. The file server or filer may be embodied as a storage system including a storage operating system that implements a file system to logically organize the information as a hierarchical structure of directories and files on, e.g., the disks. Each "on-disk" file may be implemented as set of data structures, e.g., disk blocks, configured to store information, such as the actual data for the file. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application executing on a computer that "connects" to the filer over a computer network, such as a point-to-point link, shared local area network, wide area network or virtual private network implemented over a public network, such as the Internet. Each client may request the services of the file system on the filer by issuing file system protocol messages (in the form of packets) to the filer over the network.

A common type of file system is a "write in-place" file system, wherein the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks.

Both the write-anywhere file system and the write in-place file system may be implemented on a file server configured to generate a persistent image of its active file system at a particular point in time for, e.g., storage on disk. The disk storage may be implemented as one or more storage "volumes" that comprise a cluster of physical storage devices (disks) defining an overall logical arrangement of disk space. Each volume is generally associated with its own file system. The persistent image of the active file system is useful in that it may be used in many applications, including asynchronous mirroring or other automated file system replication facilities.

Assume a client stores files organized as its home directory on a file server configured to generate a persistent image of its active file system. Some time after storing those files, the server generates the persistent image of its active file system. Assume the client thereafter performs a backup operation to (again) store all of the files in its home directory on the server. Since the persistent image was generated before the files were overwritten, the file system's notion of the files contains old contents. However, the old contents are in the persistent image; overwriting the old data blocks with new data results in allocating new blocks and writing the new data to the new blocks.

Accordingly, the majority of data in the home directory is identical to that stored during the previous backup operation and the effective behavior is that the "old" contents of each file are replaced with "new" contents that happen to be the same as the previous contents. Unfortunately, if those previous file contents already reside in the persistent disk image, the file system may be "unaware" of the fact that the new contents are identical and therefore writes the new data to new locations on the disk. This results in two copies of the same data for the same file and, hence, duplication and inefficient disk storage of the file data.

One solution to this problem is to disable generation of persistent images of an active file system on the server volume. However, this may be undesirable because those features, benefits and applications that rely on such persistent images will no longer be available to the client. Another solution is to check the contents of the file in all persistent images at the time the file is overwritten. This may not always be possible because at write-time, the client may send less than one block of data per write operation (i.e., a partial write operation). Also, there could be multiple write operations before an entire block is full. These actions can result in numerous unnecessary and inefficient block comparison operations. The present invention is directed to solving the inefficiencies associated with file servers configured to generate persistent images of their active file systems.

SUMMARY OF THE INVENTION

The present invention comprises a file folding technique that reduces the number of duplicate data blocks of a file consumed on a storage device of a file server configured to generate a persistent image of its active file system at a point in time. According to the file folding technique, if "old" data blocks of the file are over-written with "new" data and that new data is identical to the data of the persistent file image, the old data blocks are "freed" and the file is directed to refer to the persistent image for its data. Advantageously, the invention reduces disk space consumption in a file server configured to generate persistent images of its active file system and, in particular, reduces overall persistent image disk usage.

In the illustrative embodiment, the technique is preferably implemented via a command issued to the file system that invokes a novel "file folding" process to investigate folding of a file. Execution of the file folding command results in scanning of the file in the active file system and comparing the contents of its data blocks with the contents of the data blocks of the same file in the most recent ("newest") persistent image. If a block is identical, the "new" block from the active file system is freed and the file is updated to refer to the "old" block in the persistent image.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN
ILLUSTRATIVE EMBODIMENT

Figure 1:
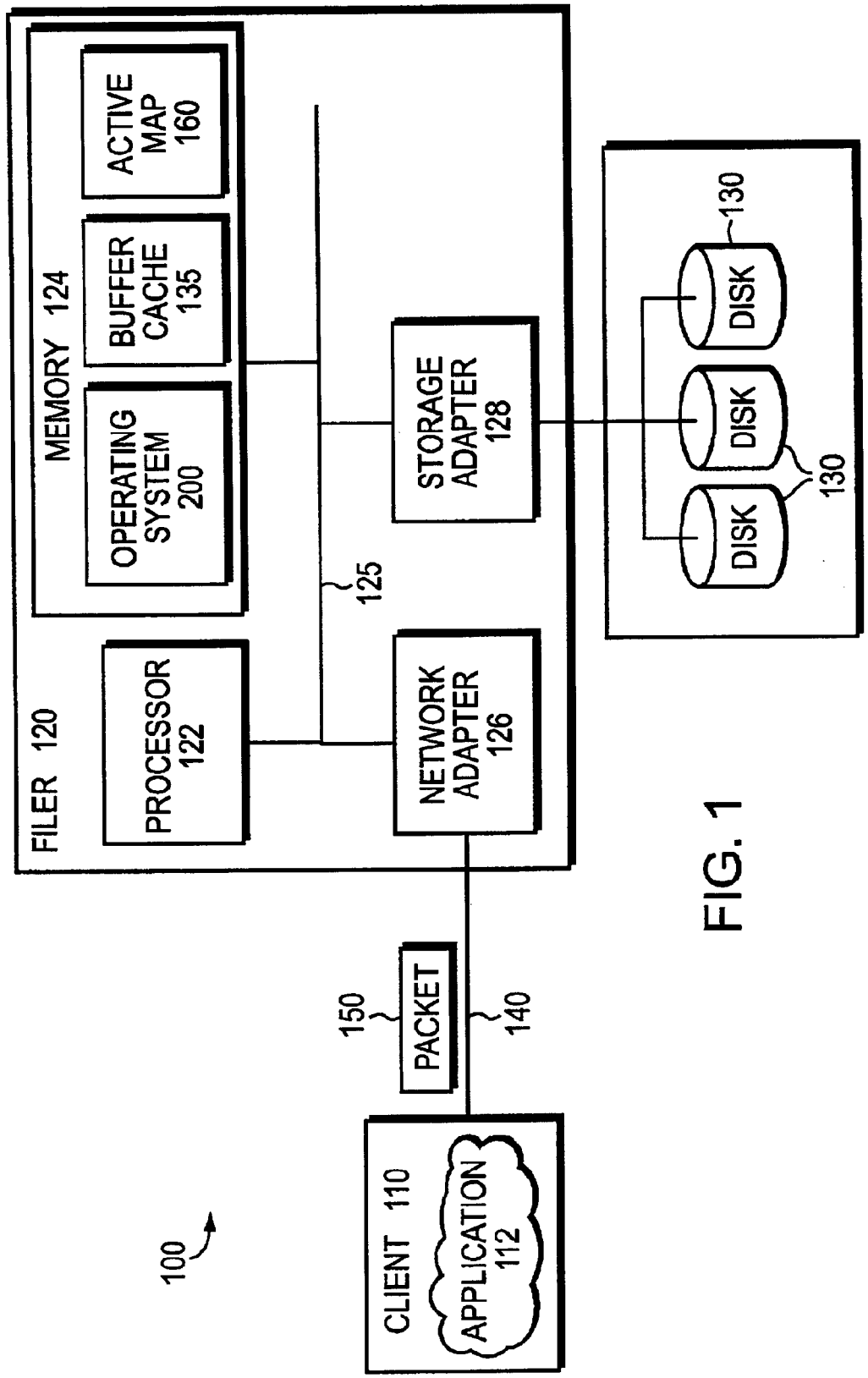
FIG. 1 is a schematic block diagram of a network environment including a file server that may be advantageously used with the present invention.

FIG. 1 is a schematic block diagram of a network environment 100 including a file server, such as a network storage appliance, that may be advantageously used with the present invention. The file server or filer 120 is a computer that provides file service relating to the organization of information on storage devices, such as disks 130. The filer 120 comprises a processor 122, a memory 124, a network adapter 126 and a storage adapter 128 interconnected by a system bus 125. The filer 120 also includes a storage operating system 200 that implements a file system to logically organize the information as a hierarchical structure of directories and files on the disks.

In the illustrative embodiment, the memory 124 comprises storage locations that are addressable by the processor and adapters for storing software program code and data structures associated with the present invention. A portion of the memory may be further organized as a "buffer cache 135" for storing other data structures associated with the present invention. The processor and adapters may, in turn, comprise processing elements and/or logic circuitry configured to execute the software code and manipulate the data structures. The storage operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications 112. Moreover, the client 110 may interact with the filer 120 in accordance with a client/server model of information delivery. That is, the client may request the services of the filer, and the filer may return the results of the services requested by the client, by exchanging packets 150 encapsulating, e.g., the Common Internet File System (CIFS) protocol or Network File System (NFS) protocol format over the network 140.

The storage adapter 128 cooperates with the storage operating system 200 executing on the filer to access information requested by the client. The information may be stored on the disks 130 or other similar media adapted to store information. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

Storage of information on the filer is preferably implemented as one or more storage "volumes" that comprise a cluster of physical storage disks 130, defining an overall logical arrangement of disk space. Each volume is generally associated with its own file system. To facilitate access to the disks 130, the storage operating system 200 implements a write-anywhere file system that logically organizes the information as a hierarchical structure of directories and files on the disks. Each "on-disk" file may be implemented as set of disk blocks configured to store information, such as data, whereas the directory may be implemented as a specially formatted file in which names and links to other files and directories are stored.

In the illustrative embodiment described herein, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate file system, including a write in-place file system, configured to generate a persistent image of the active file system at a particular point in time can be used. As such, where the term "WAFL" is employed, it should be taken broadly to refer to any file system that is otherwise adaptable to the teachings of this invention.

Figure 2:
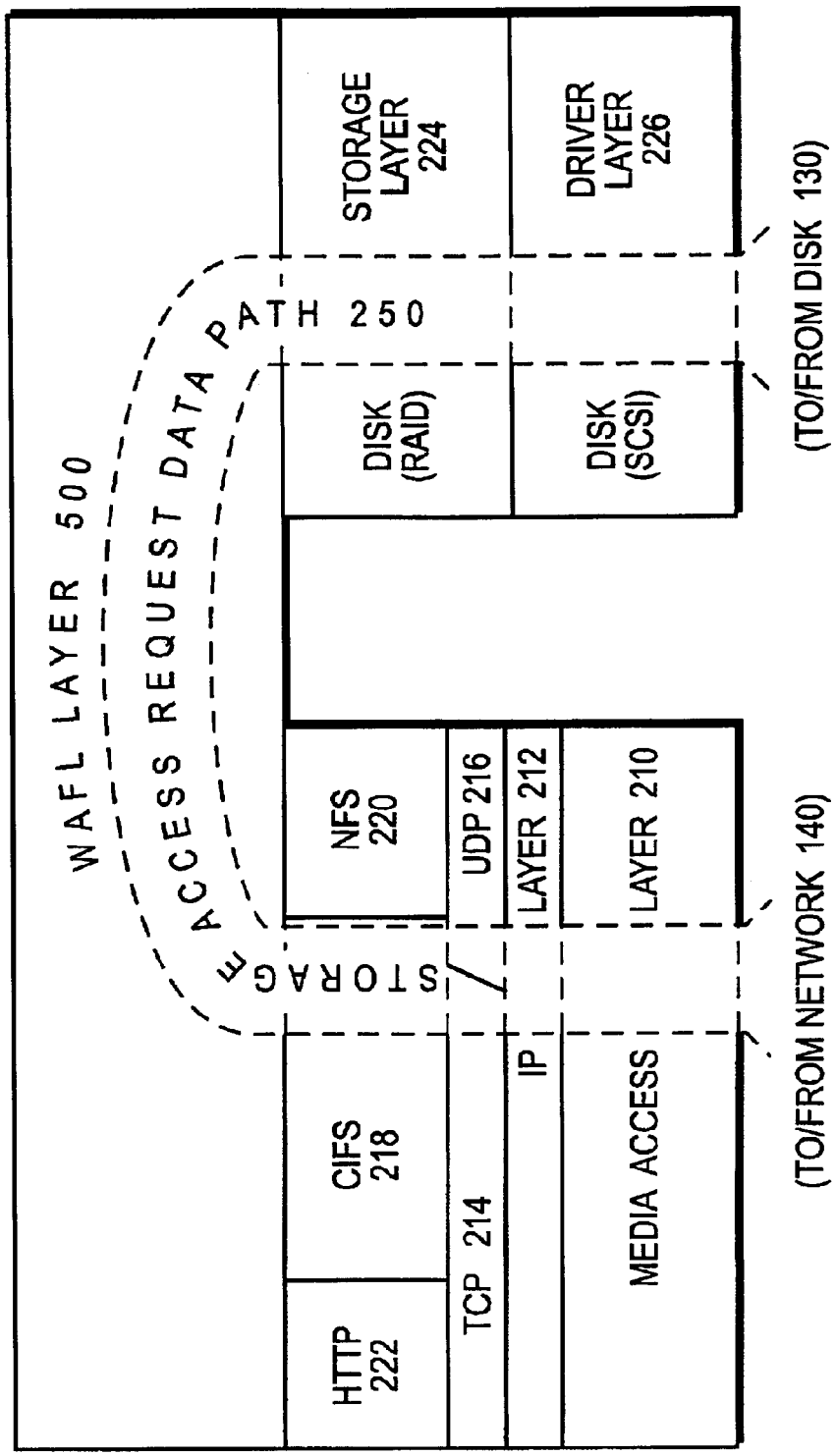
FIG. 2 is a schematic block diagram of a storage operating system that may be advantageously used with the present invention.

FIG. 2 is a schematic block diagram of the Data ONTAP operating system 200 that may be advantageously used with the present invention. The storage operating system comprises a series of software layers, including a media access layer 210 of network drivers (e.g., an Ethernet driver). The operating system further includes network protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the CIFS protocol 218, the NFS protocol 220 and the Hypertext Transfer Protocol (HTTP) protocol 222. In addition, the storage operating system 200 includes a disk storage layer 224 that implements a disk storage protocol, such as a Redundant Array of Independent Disks (RAID) protocol, and a disk driver layer 226 that implements a disk access protocol such as, e.g., a Small Computer Systems Interface (SCSI) protocol.

Bridging the disk software layers with the network and file system protocol layers is a WAFL layer 500 that preferably implements the WAFL file system. The on-disk format representation of the WAFL file system is block-based using, e.g., 4 kilobyte (KB) blocks and using inodes to describe the files. The WAFL file system uses files to store meta-data describing the layout of its file system; these meta-data files include, among others, an inode file. A file handle, i.e., an identifier that includes an inode number, is used to retrieve an inode from disk.

Broadly stated, all inodes of the WAFL file system are organized into the inode file. A file system (FS) info block specifies the layout of information in the file system and includes an inode of a file that includes all other inodes of the file system. Each volume (file system) has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 110 is forwarded as, e.g., a conventional CIFS or NFS protocol packet 150 over the computer network 140 and onto the filer 120 where it is received at the network adapter 126. A network driver of the media access layer 210 processes the packet, passes it onto the network protocol layers 212–216 and CIFS or NFS layer 218, 220 for additional processing prior to forwarding to the WAFL layer 500. Here, the WAFL file system generates operations to load (retrieve) the requested data from disk 130 if it is not resident "in core", i.e., in the buffer cache 135. If the information is not in the cache, the WAFL layer 500 indexes into the inode file using the inode number to access an appropriate entry and retrieve a logical volume block number (VBN). The WAFL layer then passes the logical VBN to the disk storage (RAID) layer 224, which maps that logical number to a disk block number and sends the latter to an appropriate driver (e.g., SCSI) of the disk driver layer 226. The disk driver accesses the disk block number from disk 130 and loads the requested data block(s) in buffer cache 135 for processing by the filer. Upon completion of the request, the filer (and operating system) returns a reply to the client 110 over the network 140.

It should be noted that the software "path" through the storage operating system layers described above needed to perform data storage access for the client request received at the filer may alternatively be implemented in hardware. That is, in an alternate embodiment of the invention, the storage access request data path 250 may be implemented as logic circuitry embodied within a field programmable gate array (FPGA) or an application specific integrated circuit (ASIC). This type of hardware implementation increases the performance of the file service provided by filer 120 in response to a file system request packet 150 issued by client 110. Moreover, in another alternate embodiment of the invention, the processing elements of network and storage adapters 126, 128 may be configured to offload some or all of the packet processing and storage access operations, respectively, from processor 122 to thereby increase the performance of the file service provided by the filer. It is expressly contemplated that the various processes, architectures and procedures described herein can be implemented in hardware, firmware or software.

As used herein, the term "storage operating system" generally refers to the computer-executable code operable on a computer that manages data access and may, in the case of a filer, implement file system semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
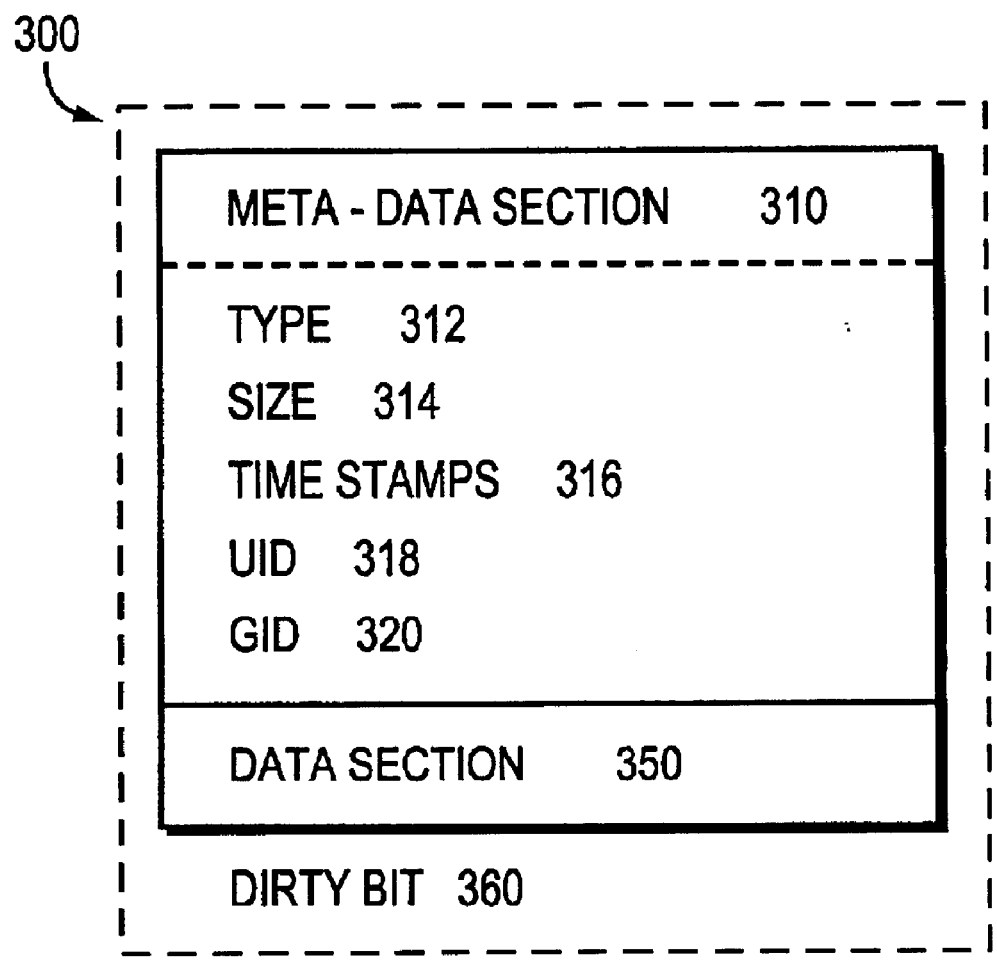
FIG. 3 is a schematic block diagram illustrating an inode data structure that may be advantageously used with the present invention.

In the illustrative embodiment, a file is represented in the WAFL file system as an inode data structure adapted for storage on the disks 130. FIG. 3 is a schematic block diagram illustrating an inode 300, which preferably includes a meta-data section 310 and a data section 350. The information stored in the meta-data section 310 of each inode 300 describes the file and, as such, includes the type (e.g., regular or directory) 312 of file, the size 314 of the file, time stamps (e.g., creation, access and/or modification) 316 for the file and ownership, i.e., user identifier (UID 318) and group ID (GID 320), of the file. The contents of the data section 350 of each inode, however, may be interpreted differently depending upon the type of file (inode) defined within the type field 312. For example, the data section 350 of a directory inode contains meta-data controlled by the file system, whereas the data section of a regular inode contains user-defined data. In this latter case, the data section 350 includes a representation of the data associated with the file.

Specifically, the data section 350 of a regular on-disk inode may include user data or pointers, the latter referencing 4 KB data blocks on disk used to store the user data. Each pointer is preferably a logical VBN to thereby facilitate efficiency among the file system and the disk storage (RAID) layer 224 when accessing the data on disks. Given the restricted size (e.g., 128 bytes) of the inode, user data having a size that is less than or equal to 64 bytes is represented, in its entirety, within the data section of that inode. However, if the user data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 350 of the inode (e.g., a level 2 inode) references an indirect block (e.g., a level 1 block) that contains 1024 pointers, each of which references a 4 KB data block (e.g., a level 0 block) on disk. For user data having a size greater than 64 MB, each pointer in the data section 350 of the inode (e.g., a third level inode) references a double-indirect block (e.g., a level 2 block) that contains 1024 pointers, each referencing an indirect, level 1 block. The indirect block, in turn, contains 1024 pointers, each of which references a 4 KB direct level 0 data block on disk. Each data block is loaded from disk 130 into the buffer cache 135 in order to access the data.

Figure 4:
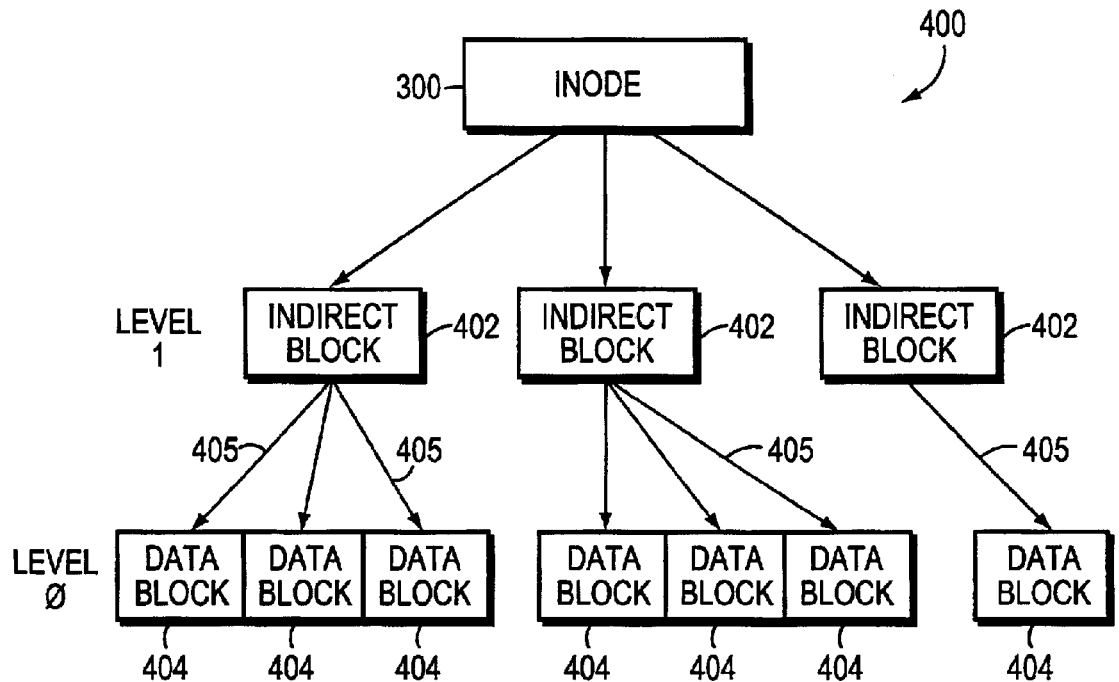
FIG. 4 is a schematic block diagram illustrating an organization of blocks in a file system of the file server.

FIG. 4 is a schematic block diagram illustrating the organization of blocks as an inode buffer tree 400 in the file system. An inode 300, such as an embedded inode, references indirect, level 1 blocks 402. As noted, these indirect blocks contain pointers 405 (e.g., VBNs) that reference level 0 data blocks 404 used to store the actual data of a file. That is, the data of a file are contained in data blocks and the locations of these blocks are stored in the indirect blocks of the file. Each indirect block 402 may contain pointers to as many as 1024 data blocks. According to the "write anywhere" nature of the illustrative file system, these blocks may be located anywhere on the disks 130 of the file system.

When an on-disk inode (or block) is loaded from disk 130 into buffer cache 135, its corresponding in core structure embeds the on-disk structure. For example, the dotted line surrounding the inode 300 (FIG. 3) indicates the in core representation of the on-disk inode structure. The in core structure is a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data is marked "dirty" using the dirty bit 360 so that the inode (block) can be subsequently "flushed" (stored) to disk.

The WAFL file system is adapted to "freeze frame" itself at any point in time and make that frozen versions of the file system available via special subdirectories that appear in the current (active) file system. Each freeze-framed version of the file system is called a snapshot™. The snapshot operates at the block level of the WAFL file system and represents a persistent image of the active file system at a particular point in time, e.g., at a consistency point (CP) transition. Rather than discarding the old copy of the file system at the CP, the WAFL file system saves it as a snapshot. Thus, snapshots enable the filer to save copies of its file system state at various times. The in core and on-disk format structures of the WAFL file system, including snapshots, inodes and the inode file, are disclosed and described in U.S. Pat. No. 5,819,292 titled Method for Maintaining Consistent States of a File System and for Creating User-Accessible Read-Only Copies of a File System by David Hitz et al., issued on Oct. 6, 1998, which patent is hereby incorporated by reference as though fully set forth herein.

It should be noted that "snapshot" is a trademark of Network Appliance, Inc. It is used for purposes of this patent to designate a persistent CP image. A persistent CP image (PCPI) is a point-in-time representation of the storage system, and more particularly, of the active file system, stored on a storage device (e.g., on disk) or in other persistent memory and having a name or other identifier that distinguishes it from other PCPIs taken at other points in time. A PCPI can also include other information (meta-data) about the active file system at the particular point in time for which the image is taken. The terms "PCPI" and "snapshot" shall be used interchangeably through out this patent without derogation of Network Appliance's trademark rights.

Figure 5:
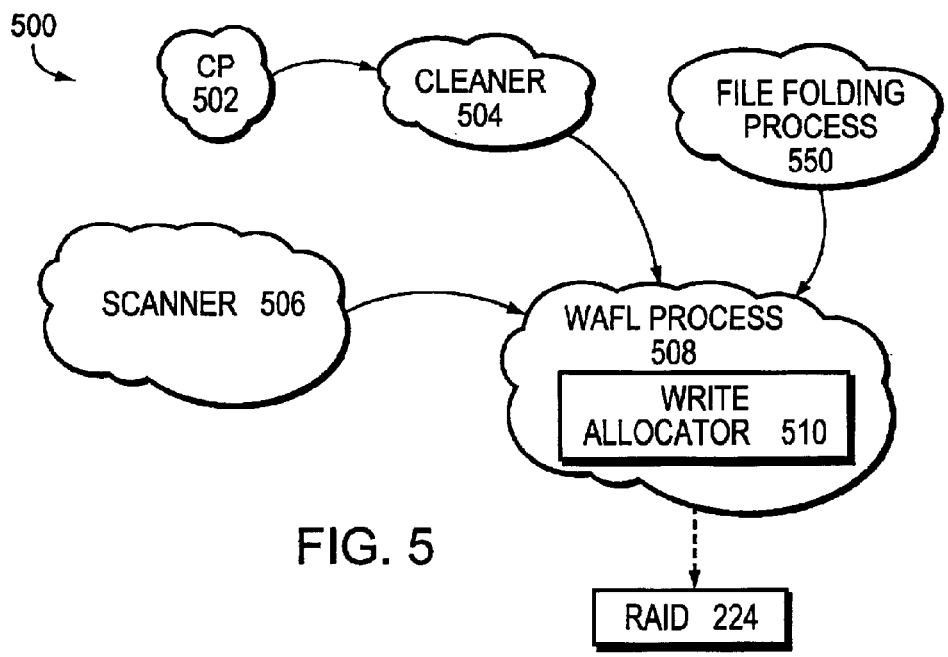
FIG. 5 is a schematic block diagram illustrating various processes within a file system layer of the storage operating system.

Various processes within the WAFL layer cooperate to service a client request "in core" and thereafter "dirty" the appropriate inodes and blocks prior to storing (writing) them to disks. FIG. 5 is a schematic block diagram illustrating the various processes within the WAFL layer 500 of the storage operating system 200. These processes include a CP process 502, a cleaner process 504, a scanner process 506 and a WAFL process 508. In general, the WAFL process 508 performs all the work in the WAFL layer, e.g., loading blocks into the buffer cache 135, setting dirty bits of the blocks, and acquiring blocks for "cleaning". The WAFL process 508 is preferably implemented as two processes, WAFL_LoPri and WAFL_HiPri, only one of which can run at a time and which are interchangeable except for the priority level at which they run. The scanner, CP and cleaner processes are essentially administrative processes that manage the work performed by the WAFL process. To that end, the administrative processes send messages to the WAFL process 508, instructing that process to execute particular functions with particular data supplied by the administrative processes. The WAFL process then processes/manipulates the data structures in the buffer cache and sends messages to the RAID layer 224 for purposes of loading/storing data on disks.

For example, the CP process 502 manages write allocation operations (including the generation of a snapshot during a CP operation) of the file system, whereas the cleaner process 504 manages "cleaning" of the buffer cache 135. These processes cooperate to provide dirtied blocks from the cache 135 to a write allocator 510 of the WAFL process. The write allocator 510 interacts with the RAID layer to obtain information about the layout of the disks. In addition, the write allocator interacts with other processes of the WAFL layer 500, including the scanner 506, to obtain information relating to the optimal order of which data for files should be written to the disks. The write allocator 510 then writes the data to disk, one file at a time, in accordance with a write allocation algorithm. To invoke write allocation, the cleaner process 504 sends a message to the WAFL process 508 requesting a write allocation function for a particular structure (e.g., inode).

It should be noted that all write operations in the file system are performed to "free space" blocks on disks. A free space block represents an available location (e.g., data block 404) on disk that is not currently used to store valid information. When storing a file to disk, the write allocator 510 of the WAFL layer 500 writes into these free blocks at a write allocation point. The write allocator generally writes only a certain number of blocks to a given disk prior to moving to a next disk, so as to spread the data across multiple disks. Notably, the write allocator 510 writes the file data in generally the same area of the disk during a CP operation.

The present invention comprises a file folding technique that reduces the number of duplicate data blocks of a file consumed on a storage device of a file server configured to generate a persistent image of its active file system at a point in time, e.g., a snapshot. Broadly stated, each file of the active file system is compared with its corresponding file in the snapshot and, if their data contents are identical, the file of the active file system is "folded" into, i.e., updated to refer to, the file in the snapshot. In other words, if "old" data blocks of the file are over-written with "new" data and that new data is identical to the data of the snapshot, the old data blocks are "freed" and the file is directed to refer to the snapshot for its data. The inventive technique thus reduces disk space consumption in a file server configured to generate snapshots and, in particular, reduces overall persistent image disk usage.

In the illustrative embodiment, the WAFL file system is capable of generating a plurality of, e.g., thirty-one (31), snapshots or persistent images of the file system at various points in time. Although folding of files against any snapshot would be flexible and useful, it would disrupt a data block usage snapshot invariant of the file system. Therefore, file folding as described herein is preferably invoked only with respect to a most recent snapshot.

The novel technique illustratively comprises a first stage for determining files that may be candidates for folding into corresponding files of the most recent snapshot and a second stage that actually folds the files into the snapshot files. It should be noted that the file folding technique is not specific to any particular protocol (e.g., CIFS or NFS) and, in fact, may be invoked in response to either a command line interpreter (CLI) interface command from an administrator, a predetermined volume operation or a client request to fold a particular file. Invocation of the file folding stages generally requires only passing of message containing a full pathname (i.e., a pathname and filename) of a file in a volume to the file system.

For example, the administrator may employ a script (e.g., a UNIX "find" command) that traverses all files of a volume to produce full path names of those files. The administrator may then "call" into the file system via the CLI using, e.g., a Remote SHell (RSH) command to pass each full pathname. Alternatively, any file system protocol supported by the filer may utilize a "front-end" engine that produces full pathnames of files, which are then individually passed to the file system using, e.g., a predetermined application programming interface (API) call. Each of these calls is then passed to the file system in a message having a predetermined format.

Figure 6:
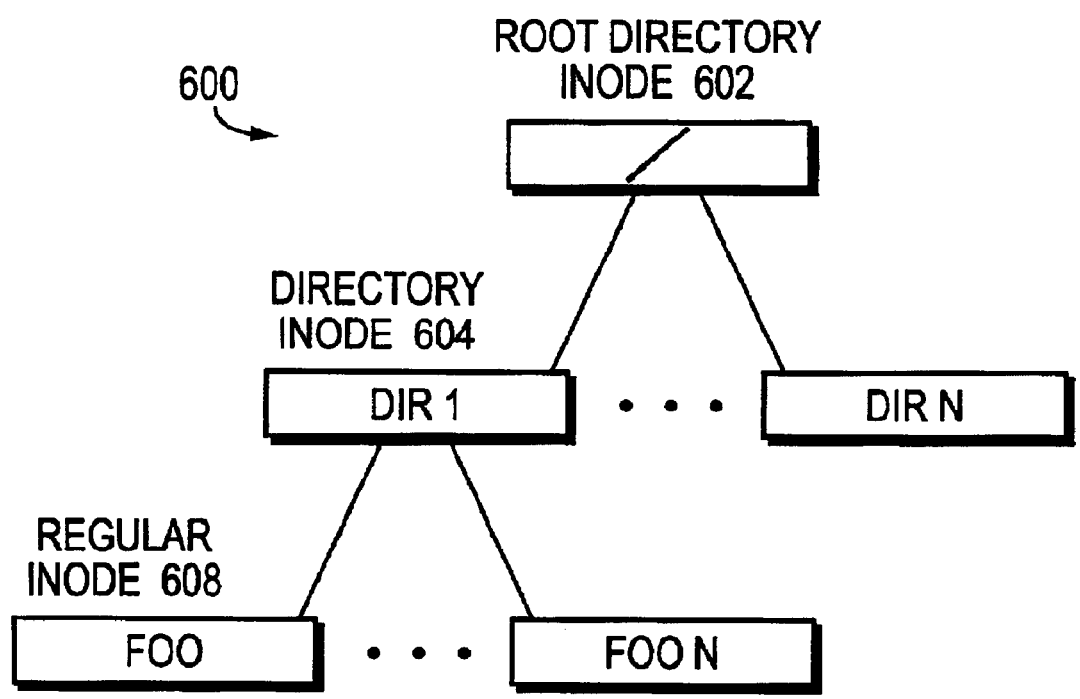
FIG. 6 is a schematic block diagram illustrating a hierarchical on-disk inode structure of the file system.

In response to receiving the message for a file that may be a candidate for folding, various processes of layer 500 (hereinafter "the WAFL layer 500") determine whether inodes for the pathname (directory) and filename (file) exist within its on-disk file system structure so that it may retrieve the inode of the file. Assume that the full pathname of the candidate file is /dir1/foo. The inode of the candidate file foo is retrieved via a series of full pathname lookup operations into an on-disk inode tree structure of the active file system. FIG. 6 is a schematic block diagram illustrating the hierarchical on-disk inode structure 600 of the illustrative file system. Specifically, the WAFL layer 500 parses the first (/) preceding the pathname dir1 and maps it to a root inode structure 602 of its file system. The root inode is a directory having a plurality of entries, each of which stores a name of a directory or a file and its corresponding inode number. Armed with a name and inode number, the operating system 200 can construct a file handle to retrieve the block (inode) from disk.

Broadly stated, a name is an external representation of an inode data structure, i.e., a representation of the inode as viewed external to a file system. In contrast, the file handle is a unique representation of the data structure, i.e., a representation of the inode data structure that is used internally within the file system. The file handle generally consists of a plurality of components including a file ID (inode number), a snapshot ID, a generation ID and a flag. The file handle is exchanged between the client and server (filer) over the network to enable the filer to efficiently retrieve the corresponding file or directory. That is, the file system may efficiently access a file or directory by mapping its inode number to a block on disk using the inode file. Use of the file handle thus obviates the need to exchange pathnames and perform lookup operations to retrieve the appropriate file or directory inode from disk. The filer returns (to the client) a file handle corresponding to a file upon completion of an operation.

Accordingly, the WAFL layer loads the root directory inode 602 from disk 130 into buffer cache 135, such that the root inode is represented as an incore inode, and loads any data blocks referenced by the incore root inode. The WAFL layer then searches the contents of the root inode data blocks for a directory name "dir1". If the dir1 directory name is found in those data blocks, the WAFL layer uses the corresponding inode number to retrieve the dir1 directory inode 604 from disk and loads it (and its data blocks) into cache 135 as incore inode structure(s). As with the root inode, the directory inode has a plurality of entries; here, however, each entry stores a name of a regular file and its corresponding inode number. The WAFL layer 500 searches the entries of the dir1 directory inode data blocks to determine whether the regular inode file name "foo" exists and, if so, obtains its corresponding inode number and loads the regular inode 608 from disk into the buffer cache.

Once the inode 608 for the file in the active file system is obtained, the WAFL layer 500 retrieves the corresponding inode of the file from the most recent snapshot. In general, when a snapshot is generated, a new root inode (similar to the active file system root inode 602) is created for that snapshot. This new inode forms the root of an on-disk inode tree structure of the snapshot and is called the "snapshot root" inode. The on-disk snapshot inode tree structures are preferably stored in the inode file.

In the illustrative embodiment, the most recent snapshot inode tree can be identified from among all of the 31 snapshot inode trees by examining the time stamp of when the snapshot root inode was created. This time stamp is contained in a time stamp field, similar to field 316, of the snapshot root inode. The snapshot root inodes of all snapshots are preferably sorted, in order, by time stamp when the volume is mounted. The most recent snapshot inode is thus stored first, e.g., at a head of a queue. Once the most recent snapshot inode tree structure is identified, the snapshot inode of the file corresponding to the inode of the file in the active file system is retrieved using the process described above. If there is no corresponding snapshot inode, the file is not in the most recent snapshot and no folding can occur. However, if there is a snapshot inode corresponding to the active file, then that inode is loaded into the buffer cache and a determination is made as to whether the file is a candidate for folding.

Figure 7:
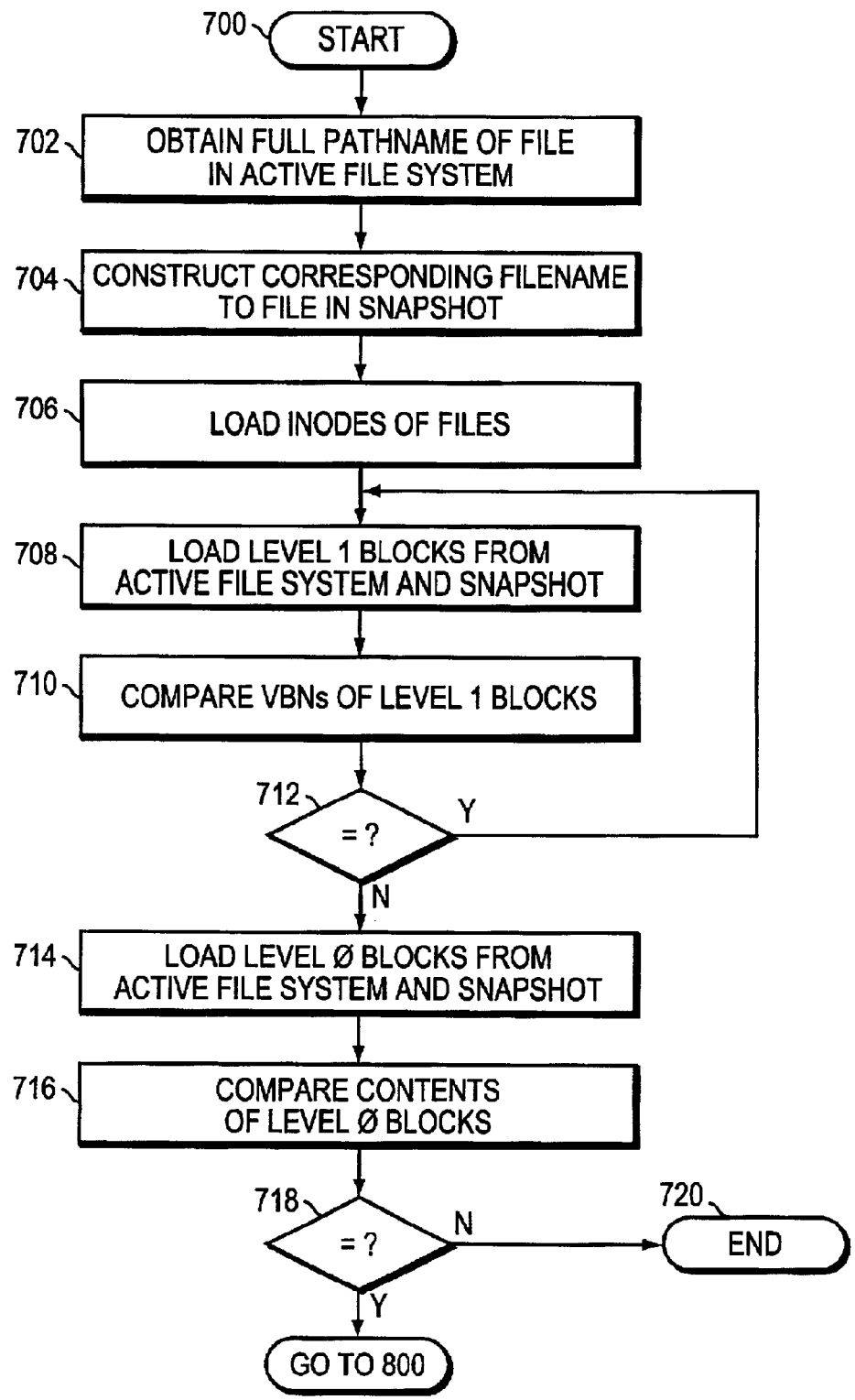
FIG. 7 is a flowchart illustrating the sequence of steps involved in a first stage of a file folding technique in accordance with the present invention.

FIG. 7 is a flowchart illustrating the sequence of steps involved in the first stage of the novel file folding technique. The sequence starts at Step 700 and proceeds to Step 702 where the full pathname of the file in the active file system is obtained by the file system layer 500. In Step 704, the corresponding filename to the file in the most recent snapshot is constructed and, in Step 706, the inodes of the active file system and snapshot files are loaded into buffer cache 135, as described above. Using the inode from the active file system, the inode buffer trees 400 for both active file system and the most recent snapshot are traversed and, in Step 708, their level 1 blocks 402 are loaded into the buffer cache.

In Step 710, as the level 1 blocks are loaded, the VBN of each level 1 block from the active file system is compared with the VBN of the corresponding level 1 block from the most recent snapshot and a determination is made in Step 712 as to whether those VBNs are equal. If the VBNs match, then the level 1 blocks refer to a common level 0 data block and their "children", i.e., all level 0 data blocks, are identical as well. Hence, further processing of the current indirect block is skipped (aborted), the sequence returns to Step 708 and the next one is loaded. However, if the VBNs are not equal and the VBN of the buffer from the snapshot is not already used in the active file system, then the level 0 data blocks for the active file system and the most recent snapshot are loaded into the buffer cache (Step 714). It should be noted that loading of the level 1 blocks is not required and doing so is an optimization of the present invention. The alternative is to load only the level 0 blocks. As noted, the VBNs pointing to the level 0 blocks 404 are stored as data in the level 1 blocks 402.

As these blocks are loaded, the file folding process 550 compares the data contents of the active file system and snapshot level 0 blocks, on a block-by-block basis (Step 716). In Step 718, a determination is made as to whether the contents of each data block are identical. If not, it is resolved that the block is not a candidate for folding and the sequence ends at Step 720. If the data contents are equal, the candidate level 0 data block of the active file system may be folded into its corresponding snapshot data block and the first stage of the technique transitions to the second stage. It should be noted that the comparison operations described in connection with the file folding technique are preferably performed using a kernel-level routine, e.g., buffer_compare.

Figure 8:
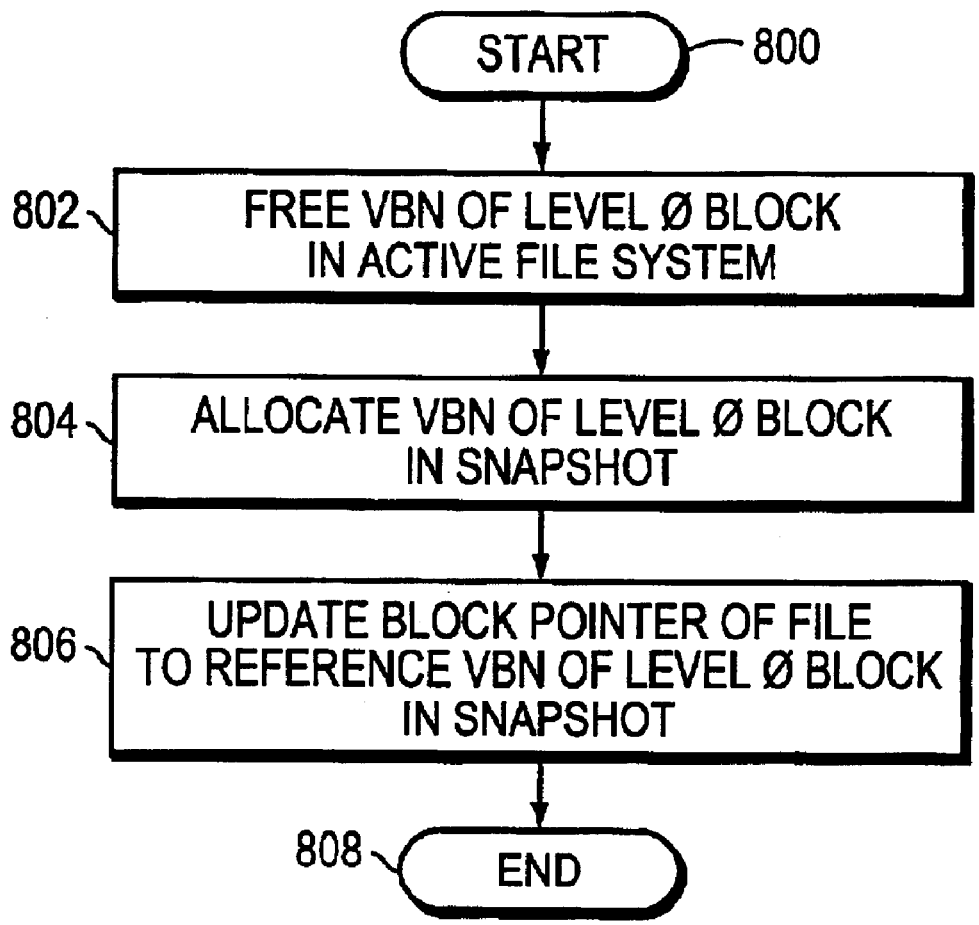
FIG. 8 is a flowchart illustrating the sequence of steps involved in a second stage of the novel file folding technique.

FIG. 8 is a flowchart illustrating the sequence of steps involved in the second stage of the novel file folding technique where a level 0 data block of the active file system is folded into a corresponding data block of the most recent snapshot. The sequence starts at Step 800 and proceeds to Step 802 where the VBN of the data block in the active file system is "freed". In the illustrative embodiment, a data block is freed by updating a corresponding bit of an active map 160 of the active file system to indicate that the block is not allocated. An example of an active map that may be advantageously used with the present invention is described in U.S. patent application Ser. No. 09/642,061 titled, Instant Snapshot, by Lewis et al. filed Aug. 18, 2000, which application is hereby incorporated by reference as though fully set forth herein.

In Step 804, the VBN of the level 0 data block in the snapshot is allocated by, e.g., updating a bit of the active map 160 corresponding to the snapshot block to indicate that the block is being used, i.e., is allocated. Thereafter, in Step 806, the block pointer 405 of the parent buffer (either the indirect block, e.g., level 1 block 402 or inode 300) of the data block in the active file system is updated to point to (reference) the VBN of the level 0 block in the snapshot. Thereafter, the parent buffer is marked as "dirty" to ensure that it (and all its ancestors) are written out to disk on the next CP. The sequence then ends at Step 808.

While there have been shown and described an illustrative embodiment for reducing the number of duplicate data blocks of a file consumed on a storage device of a file server configured to generate a persistent image of its active file system at a point in time, it is to be understood that various other adaptations and modifications may be made within the spirit and scope of the invention. For example, an alternate embodiment for folding a file may comprise simply marking the buffer as being folded. Thereafter, during the write allocation phase of a CP, any buffer marked as being folded can be skipped and a new block need not be allocated for it.

In addition, an optimization for the illustrative file folding technique described herein may arise after loading the level 0 data blocks of the active file system and snapshot in the buffer cache. Instead of immediately comparing the data contents of respective level 0 blocks, RAID checksums associated with these blocks may be compared. If the checksums do not match, the contents of the data blocks are different and a comparison operation between those contents may be avoided since the active file system block is not a candidate for file folding. This optimization conserves processing resources of the filer, while improving the efficiency of the overall file folding process. Of course, if the checksums are equal, then the contents of the data blocks are compared as described herein. An example of a RAID checksum comparison technique that may be advantageously used with the present invention is described in U.S. patent application Ser. No. 09/642,062 titled, Dynamic Data Space, by Sundaram et al., filed Aug. 18, 2000, which application is hereby incorporated by reference as though fully set forth herein.

Moreover, it should be noted that while a file is being folded, other snapshot operations are still allowed. That is, the novel file folding process described herein does not impede or prevent other snapshot operations. Specifically, new snapshots can be created and snapshots can be deleted. Creating a new snapshot while a file is being folded results in in-progress folds never folding another block. This happens because the newly created snapshot will now contain whatever blocks are in the file. The folding process thus traverses through the rest of the file and finds that each block has the same VBN in both the active file system and the most recent snapshot. Deleting the most recent snapshot results in in-progress folds using the next most recent snapshot to fold against. If there are no more snapshots after deleting the most recent snapshot, folding stops. Deleting any other snapshot other than the most recent snapshot has no effect on in-progress folds.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for reducing duplicate data of a file stored on a storage device of a server having an active file system, the method comprising the steps of:

generating a persistent image of old data for the file in the active file system;

overwriting the old data of the file in the active file system with new data;

comparing contents of the data blocks for the active file system and persistent image on a block-by-block basis;

determining whether the new data is identical to the old data of the persistent image; and if so, folding the new data of the file in the active file system into the old data of the persistent image.

2. The method of claim 1 wherein the step of determining comprises the steps of:

obtaining a full pathname of the file in the active file system;

constructing a corresponding filename to the file in the persistent image; and loading inodes of the active file system and persistent image files into a memory of the server.

3. The method of claim 2 wherein the step of determining further comprises the steps of:

traversing inode buffer trees for both the active file system and the persistent image; and loading indirect blocks of the active file system and the persistent image into the memory.

4. The method of claim 1 wherein the step of folding comprises the step of freeing the data block of the file in the active file system.

5. The method of claim 4 wherein the step of freeing comprises the step of updating a corresponding bit of an active map of the active file system to indicate that the block is not allocated.

6. The method of claim 4 wherein the step of folding further comprises the step of allocating a VBN of the data block in the persistent image.

7. The method of claim 6 wherein the step of allocating comprises the step of updating a bit of an active map corresponding to the data block in the persistent image to indicate that the block is being used.

8. The method of claim 6 wherein the step of folding further comprises the step of updating the file in the active file system to refer to the persistent image for data of the file.

9. A The method of claim 8 wherein the step of updating comprises the step of updating a block pointer of an inode of the file in the active file system to reference the VBN of the data block in the persistent image.

10. The method of claim 9 further comprising the step of marking the inode as dirty to ensure that it is written to the storage device.

11. A method for reducing duplicate data of a file stored on a storage device of a server having an active file system, the method comprising the steps of:
generating a persistent image of old data for the file in the active file system;
overwriting the old data of the file in the active file system with new data;
comparing a virtual block number (VBN) of each indirect block from the active file system with a VBN of a corresponding indirect block from the persistent image;
determining whether the VBNS are equal;
if the VBNS are equal, aborting further processing of the indirect blocks;
if the VBNS are not equal, comparing contents of the data blocks associated with the indirect blocks for the active file system and the indirect blocks for the persistent image, determining whether the new data is identical to the old data of the persistent image, and if the data is identical, folding the new data of the file in the active file system into the old data of the persistent image.

12. The method of claim 11 wherein the step of determining further comprises the steps of:
traversing inode buffer trees for both the active file system and the persistent image; and
loading data blocks of the active file system and the persistent image into the memory.

13. A system configured to reduce duplicate data of a file stored on a storage device of a storage system having an active file system, the system comprising:
a processor coupled to the storage device;
a memory coupled to the processor and having locations addressable by the processor; and
a storage operating system resident in the memory locations and executed by the processor to invoke storage operations in support of the file system, the storage operating system adapted to (i) generate a persistent image of old data for the file in the active file system, (ii) overwrite the old data of the file in the active file system with new data, and (iii) comparing contents of the data blocks for the active file system and persistent image on a block-by-block basis, (iv) determine whether the new data is identical to the old data of the persistent image, the operating system further folding the new data of the file in the active file system into the old data of the persistent image if the new and old data are identical.

14. The system of claim 13 wherein the storage system is a filer and wherein the storage device is a disk.

15. The system of claim 13 wherein the persistent image is a point-in-time representation of the storage system.

16. The system of claim 13 wherein the persistent image is a point-in-time representation of the active file system stored on the storage device or in other persistent memory and having a name or other identifier that distinguishes it from other persistent images taken at other points in time.

17. The system of claim 16 wherein the storage device is a disk.

18. Apparatus for reducing duplicate data of a file stored on a storage device of a server having an active file system, the apparatus comprising:
means for generating a persistent image of old data for the file in the active file system;
means for overwriting the old data of the file in the active file system with new, data;
means for comparing contents of the data blocks for the active file system and persistent image on a block-by-block basis
means for determining whether the new data is identical to the old data of the persistent image; and
if so, means for folding the new data of the file in the active file system into the old data of the persistent image.

19. A computer readable medium containing executable program instructions for reducing duplicate data of a file stored on a storage device of a server having an active file system, the executable program instructions comprising program instructions for:
generating a persistent image of old data for the file in the active file system;
overwriting the old data of the file in the active file system with new data;
comparing contents of the data blocks for the active file system and persistent image on a block-by-block basis
determining whether the new data is identical to the old data of the persistent image; and if so, folding the new data of the file in the active file system into the old data of the persistent image.

20. A method for reducing duplicate data of a file stored on a storage device of a storage system having an active file system, the method comprising the steps of:
generating a persistent image of a file in the active file system;
comparing new data of the file written to the active file system to the data in the persistent image;
if the new data is identical to the data in the persistent image, directing the active file system to refer to the persistent image for data of the file, thereby reducing reference to duplicate data in the active file system;
otherwise, directing the active file system to refer to new data blocks in the active to file system.

21. The method of claim 20 wherein the step of comparing comprises the steps of:
obtaining a full pathname of the file in the active file system;

constructing a corresponding filename to the file in the persistent image;
loading inodes of the active file system and persistent image files into a memory.

22. The method of claim 20 wherein the step of comparing further comprises the steps of:
traversing inode buffer trees for both the active file system and the persistent image; and
loading indirect blocks of the active file system and the persistent image into the memory.

23. The method of claim 22 wherein the step of comparing further comprises the steps of:
comparing a virtual block number (VBN) of each indirect block from the active file system with a VBN of a corresponding indirect block from the persistent image;
determining whether the VBNs are equal;
if the VBNs are equal, aborting further processing of the indirect blocks;
if the VBNs are not equal, loading data blocks for the active file system and the persistent image into the memory.

24. The method of claim 20 further comprising the step of:
if the new data is identical to the data in the persistent image, freeing the data block of the file in the active file system.

25. The method of claim 24 wherein the step of freeing comprises the step of:
updating a corresponding bit of an active map of the active file system to indicate that the block is not allocated.

26. The method of claim 24 wherein the step of freeing further comprises the step of:
allocating a VBN of the data block in the persistent image.

27. The method of claim 26 wherein the step of allocating further comprises the step of:
updating a bit of an active map corresponding to the data block in the persistent image to indicate that the block is being used.

28. The method of claim 26 wherein the step of allocating further comprises the step of:
updating a block pointer of an inode of the file in the active file system to reference the VBN of the data block in the persistent image.

29. The method of claim 28 further comprising the step of:
marking the inode as dirty to ensure that it is written to the storage device.

30. A system configured to reduce duplicate data of a file stored on a storage device of a storage system having an active file system, the system comprising:
a processor coupled to the storage device;
a memory coupled to the processor and having locations addressable by the processor; and
a storage operating system resident in the memory locations and executed by the processor to invoke storage operations in support of the file system, the storage operating system adapted to (i) generate a persistent image of a file in the active file system, (ii) compare new data of the file written to the active file system to data in the persistent image, (iii) if the new data is identical to the data in the persistent image, direct the active file system to refer to the persistent image for the data of the file, thereby reducing reference to duplicate data in the active file system; (iv) otherwise, direct the active file system to refer to new data blocks in the active file system.

31. Apparatus for reducing duplicate data of a file stored on a storage device of a storage system having an active file system, the apparatus comprising:
means for generating a persistent image of a file in the active file system;
means for comparing new data of the file written to the active file system to data in the persistent image;
means for directing the active file system to refer to the persistent image for the data of the file if the new data is identical to the data in the persistent image, thereby reducing reference to duplicate data in the active file system;
means for directing the active file system to refer to new data blocks in the active file system if the new data is not identical to the data in the persistent image.

32. A computer readable medium containing executable program instructions comprising:
executable program instructions for execution on a processor, the instructions adapted to (i) generate a persistent image of a file in the active file system, (ii) compare new data of the file written to the active file system to data in the persistent image, (iii) if the new data is identical to the data in the persistent image, direct the active file system to refer to the persistent image for the data of the file, thereby reducing reference to duplicate data in the active file system; (iv) otherwise, direct the active file system to refer to new data blocks in the active file system.

* * * * *